April 17, 1945. E. J. BRUSELL 2,373,650
OPHTHALMIC MOUNTING
Filed Sept. 8, 1941

INVENTOR
ERNEST J. BRUSELL
BY Louis L. Gagnon
ATTORNEY

Patented Apr. 17, 1945

2,373,650

UNITED STATES PATENT OFFICE 2,373,650

OPHTHALMIC MOUNTING

Ernest J. Brusell, St. Paul, Minn., assignor to American Optical Company, Southbridge, Mass., a voluntary association of Massachusetts Application September 8, 1941, Serial No. 409,960

7 Claims. (Cl. 88—41)

My invention relates to an improvement in eyeglasses wherein it is desired to provide a means of supporting the lenses which is simple to construct and which presents an attractive appearance.

This application is a continuation in part of my co-pending application Serial No. 219,781, filed July 18, 1938, now issued as Patent No. 2,255,149.

During the past few years much attention has been given to the construction of eyeglass frames for supporting lenses. Some of these frames have been formed of a channel shape to removably support the lenses therein. Other frames have been constructed which support the lenses entirely from the top edge. In all of these types of construction, the idea of providing more area through which the person using the glasses may see properly, has been carefully considered and the appearance and design have also been considered of importance.

It is a purpose of the present invention to provide glasses having frames capable of supporting the lenses by engagement therewith over a relatively small portion of the circumference of the lenses and to form this construction very simply to enable the frame to be constructed at a minimum of cost, and to be attached with a minimum of effort.

It is a purpose of my invention to construct one form of my glasses in a manner to provide a frame strap extending over the outer surface of the lens along the nasal edge of the same. This frame strap is so constructed as to extend close to the edge of the lens, but is so designed as to provide attaching means which extend through the strap and through the lens at a point sufficiently spaced from the edge thereof to prevent breaking of the lens adjacent the edge. In this form of construction it is my purpose to provide fingers or straps extending over onto the opposite surface of the lens so that the lens may be supported between these fingers and the frame strap.

It is a feature of this type of construction of my invention that the frame extends over the outer surface of the lens in such a manner that the edge portion of the lens is concealed thereby. With this construction any material between the frame strap and the lens will not be visible from the front of the lens, but only from the rear side of the same.

It is a purpose of my invention to engage both surfaces of the lens along a relatively short portion of the periphery of the lens in order to engage the lens at spaced points along one edge of the same. The manner in which the frame is constructed to engage both surfaces of the lens forms an important feature of my invention.

Another feature of the invention is to provide an ophthalmic mounting embodying lenses having a protruding attachment portion on the nasal sides thereof with spaced connection areas and a lens supporting structure having parts shaped to overlie said attachment portion with spaced connection areas aligned substantially with the connection areas of said attachment portion and means for securing said supporting structure to said lenses.

These and other objects and novel features of my invention will be more clearly and fully set forth in the following specification and claims.

In the drawing forming a part of my specification:

Figure 1:
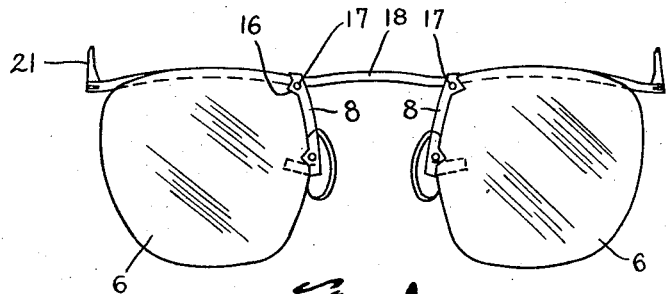
Figure 1 is a front elevational view of the mounting embodying the invention.
Figure 2:
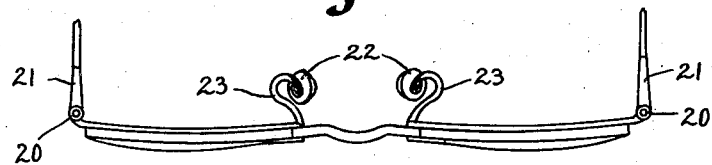
Figure 2 is a top plan view of said mounting.
Figure 3:
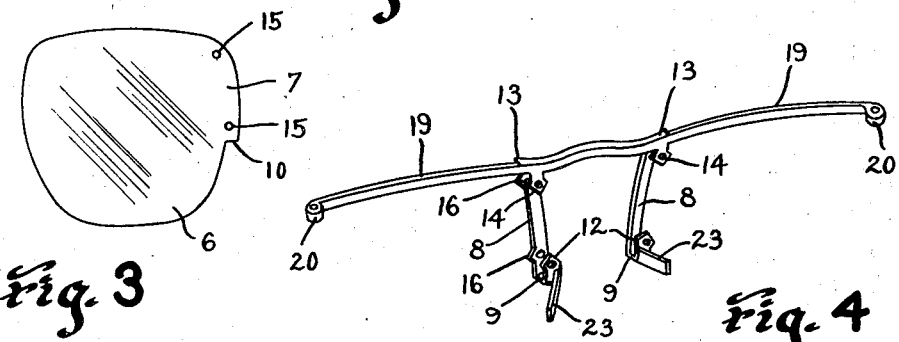
Figure 3 illustrates a lens of the type used in the mounting shown in Figures 1 and 2.

The mounting shown in Figures 1 and 2 embodies a pair of lenses 6 having a projecting portion 7 along the inner edge of the lens adjacent the nose rests and the bridge of the mounting. To this projecting portion 7 I attach a frame strap 8 which strap overlies one surface of the lens 6 and is secured thereto.

Figure 4:
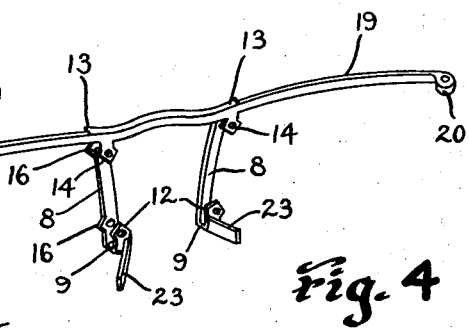
Figure 4 is a perspective view of the supporting structure or frame of the mounting shown in Figures 1 and 2.

Arms 9, best illustrated in Figure 4 of the drawing, are bent to overlie the edge of the lens in the offset 10 between the body of the lens and the projecting portion 7. These arms 9 are provided with ends 12 which extend parallel to the strap portions 8. At the upper end of the straps 8, arms 13 are provided which overlie the top edge of the lenses and which are provided with ends 14 extending substantially parallel to the strap portions 8. The projecting portion 7 of the lens is provided with spaced connection areas or openings 15 and the said portions 12 and 14 as well as portions 16 on said straps are provided with connection openings adapted to be aligned with each other and the openings 15 and to receive screws, rivets, or other fastening means 17 which extend through the portions 16 on the strap portions 8, the lenses 6 and the ends 12 and 14 respectively.

A bridge 18 connects the frame straps 8, and outwardly extending temple supporting arms 19 may be provided extending outwardly from the arms 13. These temple supporting arms 19 are designed to overlie the rear surface of each of the lenses 6, terminating in pivotal connections 20 to which bows 21 are pivotally attached.

It will be seen that in this type of construction, virtually the entire area of the lenses is open and the fastening means for the lenses engages the inner edges of the lenses adjacent the bridge and nose rests. This construction is exceedingly strong as the portion of the supporting structure or frame to which the lenses are attached is in reality a part of the nose rests and the bridge. The nose rests 22 are connected to the arms 9 or to the portions 12 by guard arms 23. Thus the nose rests are supported by one end of the lens connection portion of the supporting structure or frame, while the bridge is supported from the opposite end of the same.

The lenses 6 having the attachment projection 7 thereon may be formed of glass or of resinous or artificial resinous material such as methacrylate or other suitable plastic and may be formed to any desired contour shape and size. In instances when the lenses 6 are formed of glass the connection openings 15 are preformed therein. In instances when the lenses are formed of a plastic or resinous material the connection openings 15 may be performed or the connecting means such as rivets, screws, or the like may be heated and pressed through the material of the lens with the said lens normally having no connection opening therethrough. This is accomplished by fitting the lens to the lens supporting structure, heating the connecting means and pressing it inwardly of one of the connection openings in the members 12 or 14, through the normally solid lens and through the aligned connection opening in the member 8 after which the said connecting means may be headed over or threadedly connected with the opening in the member 8 in instances when a connecting screw is used. It is, of course, to be understood that the opening in the member 8 is previously provided with a suitably threaded bore.

If desired the various parts of the supporting structure may be all formed integral with each other or may be formed separately and thereafter joined with each other as by soldering, welding or the like. The temple supports or arms 19 may be shaped to follow the upper rear surface of the lens, the upper peripheral edge of the lens, or the upper front surface of the lens adjacent the upper edge of the lens.

The portions 8 may be placed over the front surface of the projecting portion 7 or over the rear surface as desired.

Figure 5:
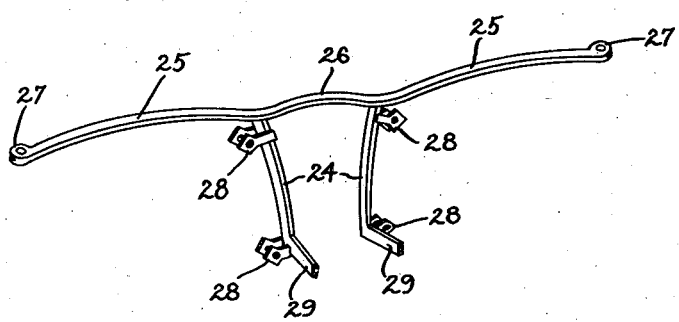
Figure 5 is a perspective view of a supporting structure or frame of slightly different construction for use with lenses such as shown in Figure 3.

In Figure 5 there is shown a frame which is similar to that illustrated in Figures 1 and 2, but in which the lens supporting straps 24 overlie the edge of the projecting portion 7 of the lens 6. These straps 24 are secured at the top to the temple supports or arms 25 adjacent the opposed ends of the bridge portion 26, the said temple supports 25 having temple connection ends 27 thereon.

Opposed sets of ears 28 having aligned connection openings therein are secured to the straps 24 adjacent the upper ends and lower ends thereof and engage the opposite surfaces of the projection 7 of the lenses 6 and are connected thereto by rivets, screws or the like in a manner similar to the first structure set forth above. The depending portions 24, adjacent the lower ends thereof, are provided with rearwardly extending nose pad supporting arms 29.

In accordance with the patent statutes I have described the principles of construction of my eyeglasses, and while I have endeavored to set forth the best embodiments thereof, I desire to have it understood that these are only illustrative of a means of carrying out my invention and that obvious changes may be made within the scope of the following claims without departing from the spirit of my invention.

Having described my invention, I claim:

1. A lens supporting structure for the lenses of an ophthalmic mounting having projecting portions on the nasal sides thereof, said lens supporting structure comprising a bridge member and relatively long and slender temple supports progressing outwardly of said bridge member and portions depending from adjacent the ends of said bridge member adapted to overlie a side surface of the projection of the lenses and having lens connection means with tongues disposed in a direction towards each other and substantially parallel with said depending portions for engaging said projecting portions of the lenses and adapted to be secured to said projecting portions.

2. A lens supporting structure for the lenses of an ophthalmic mounting having projecting portions on the nasal sides thereof, said lens supporting structure comprising a bridge member and relatively long and slender temple supports progressing outwardly of said bridge member and portions depending from adjacent the ends of said bridge member adapted to overlie a side surface of the projection of the lenses and having lens connection means with tongues disposed in a direction towards each other and substantially parallel with said depending portions for engaging said projecting portions of the lenses and adapted to be secured to said projecting portions with nose pad supporting arms secured to the lower tongue of each of said depending portions and extending rearwardly thereof.

3. An ophthalmic mounting comprising a pair of lenses of controlled contour shape each having a projection portion on the nasal sides thereof extending outwardly of the line of the general contour shape of the lens a predetermined distance with said projection portions each having spaced connection openings therein, a lens supporting structure comprising a transverse support having temple connections adjacent the opposed ends thereof with a portion of said support constituting bridge means and outwardly extending portions each shaped to follow substantially the upper contour shape of the respective lenses, depending portions adjacent the opposed ends of the bridge portion each having a portion overlying substantially entirely a side surface of the projection portion and having spaced portions overlying the opposed side surface of said projection portion in the vicinity of the connection openings therein and connecting means extending through said side surface overlying portions and the connection openings in the lenses for securing said lenses to the lens supporting structure, said depending portions having nose pad supporting arms extending rearwardly of the lenses from adjacent the lower ends of the projection portions.

4. An ophthalmic mounting comprising a pair of lenses of controlled contour shape each having a projection portion on the nasal side thereof resulting from extending said nasal edge downwardly from the upper edge to a point spaced from the lower edge, thence inwardly toward the temporal edge, and thence downwardly to the lower edge, said projection portion having spaced connection openings therein, a lens supporting structure embodying a bridge portion and relatively long and slender bar-like portions extending outwardly of the opposed sides of the bridge portion and shaped to follow substantially the upper contour shape of the lenses, said bridge portion having depending portions adjacent the opposed sides thereof each having a portion overlying a side surface of the projection portion of the corresponding lens, means overlying the opposed side surface of said projection portion, said means and said side surface overlying portion having openings therein in substantial alignment with the openings in said projection portion and means extending within said aligned openings for connecting said lens supporting structure with the lenses, said side surface overlying portion being connected with the means overlying the opposed side surface of the lens by means extending across the edge of said projection portion.

5. An ophthalmic mounting comprising a pair of lenses of controlled contour shape each having a projection portion on the nasal side thereof resulting from extending said nasal edge downwardly from the upper edge to a point spaced from the lower edge, thence inwardly toward the temporal edge, and thence downwardly to the lower edge, said projection portion having spaced connection openings therein, a lens supporting structure embodying a bridge portion and relatively long and slender bar-like portions extending outwardly of the opposed sides of the bridge portion and shaped to follow substantially the upper contour shape of the lenses, said bridge portion having depending portions adjacent the opposed sides thereof each having a portion overlying a side surface of the projection portion of the corresponding lens, means overlying the opposed side surface of said projection portion, said means and said side surface overlying portion having openings therein in substantial alignment with the openings in said projection portion and means extending within said aligned openings for connecting said lens supporting structure with the lenses, said side surface overlying portion being connected with the means overlying the opposed side surface of the lens by means extending across the edge of said projection portion, said depending portions, adjacent their lower ends each having a nose pad supporting arm extending rearwardly thereof.

6. An ophthalmic mounting comprising a pair of lenses of controlled contour shape each having a continuous uninterrupted edge line extending around the entire lens, the starting and ending points being located on the nasal side and being laterally spaced to provide an inwardly extending edge, a lens supporting structure comprising a bridge member having depending portions, one adjacent each of the opposed sides thereof, shaped substantially to the shape of the upper part of the nasal edges of the lenses and having end portions terminating adjacent the inwardly extending edges, spaced lens holding means on said depending portions each having portions overlying side surfaces of the lenses with the lower lens holding means located adjacent to said inwardly extending edges, means for securing said lens holding means to the lenses and relatively long and slender bar-like portions progressing outwardly of the opposed sides of the bridge member and shaped substantially to follow the upper contour shape of the lenses and each terminating in a temple connection.

7. An ophthalmic mounting comprising a pair of lenses of controlled contour shape each having a continuous uninterrupted edge line extending around the entire lens, the starting and ending points being located on the nasal side and being laterally spaced to provide an inwardly extending edge, a lens supporting structure comprising a bridge member having depending portions, one adjacent each of the opposed sides thereof, shaped substantially to the shape of the upper part of the nasal edges of the lenses and and having end portions terminating adjacent the inwarding extending edges, spaced lens holding means on said depending portions each having portions overlying side surfaces of the lenses with the lower lens holding means located adjacent to said inwardly extending edges, means for securing said lens holding means to the lenses and relatively long and slender bar-like portions progressing outwardly of the opposed sides of the bridge member and shaped substantially to follow the upper contour shape of the lenses and each terminating in a temple connection, said depending portions, adjacent the lower ends, each having a nose pad supporting arm extending rearwardly thereof.

ERNEST J. BRUSELL.